(12) United States Patent
Clark et al.

(10) Patent No.: US 7,759,614 B2
(45) Date of Patent: Jul. 20, 2010

(54) METHOD AND APPARATUS FOR THE TREATMENT OF A COMPONENT

(75) Inventors: Daniel Clark, Derby (GB); Steinar J Walloe, Derby (GB)

(73) Assignee: Rolls-Royce plc, London (GB)

( * ) Notice: Subject to any disclaimer, the term of this patent is extended or adjusted under 35 U.S.C. 154(b) by 1065 days.

(21) Appl. No.: 11/438,422

(22) Filed: May 23, 2006

(65) Prior Publication Data

US 2007/0042310 A1 Feb. 22, 2007

(30) Foreign Application Priority Data

Jun. 15, 2005 (GB) .................. 0512184.3

(51) Int. Cl.
*B23P 6/00* (2006.01)
*F27B 1/00* (2006.01)
*F27D 7/02* (2006.01)
*G01N 3/60* (2006.01)

(52) U.S. Cl. ............. 219/400; 219/386; 29/889.1; 427/142; 427/376.4; 427/376.8; 427/377

(58) Field of Classification Search ............. None
See application file for complete search history.

(56) References Cited

U.S. PATENT DOCUMENTS

| | | | |
|---|---|---|---|
| 3,776,689 A | | 12/1973 | Mayo |
| 4,549,866 A | | 10/1985 | Granville |
| 5,490,322 A | * | 2/1996 | Goodwater et al. ............ 29/722 |
| 5,605,274 A | * | 2/1997 | Barten et al. .................. 228/42 |
| 5,760,378 A | * | 6/1998 | Christian et al. ............ 219/603 |
| 6,010,746 A | * | 1/2000 | Descoteaux et al. ........ 427/376.7 |
| 6,097,001 A | * | 8/2000 | Richardson et al. ......... 219/400 |
| 6,250,907 B1 | * | 6/2001 | Bergman ................... 425/210 |
| 6,498,322 B1 | * | 12/2002 | Richardson et al. ......... 219/400 |
| 6,512,208 B1 | * | 1/2003 | Bergman ................... 219/400 |
| 6,560,870 B2 | * | 5/2003 | Das et al. ................... 29/889.1 |
| 6,787,720 B1 | | 9/2004 | Wong |
| 6,935,187 B1 | * | 8/2005 | Gorman et al. ............... 73/811 |
| 6,993,811 B2 | * | 2/2006 | Das et al. ................... 29/889.1 |
| 2002/0020948 A1 | * | 2/2002 | Massot et al. ................. 266/81 |
| 2002/0139794 A1 | * | 10/2002 | Budinger ................... 219/615 |
| 2005/0193831 A1 | * | 9/2005 | Gorman et al. ............... 73/811 |
| 2006/0117562 A1 | * | 6/2006 | Subramanian et al. ..... 29/889.1 |
| 2006/0157468 A1 | * | 7/2006 | Tomobe et al. .............. 219/388 |

FOREIGN PATENT DOCUMENTS

| | | |
|---|---|---|
| EP | 0 862 965 A | 9/1998 |
| EP | 0 934 795 A | 8/1999 |
| EP | 1 256 635 A | 11/2002 |
| EP | 1 609 948 A | 12/2005 |
| FR | 2 631 268 PU | 5/1988 |
| GB | 0 545 228 SP | 5/1942 |
| GB | 1 431 753 SP | 4/1976 |
| JP | 02303674 A * | 12/1990 |

* cited by examiner

*Primary Examiner*—Joseph M Pelham
(74) *Attorney, Agent, or Firm*—Jeffrey S. Melcher; Manelli Denison & Selter PLLC

(57) ABSTRACT

Apparatus, for the localised treatment of part of a blade (14), comprises an enclosure (16) that is placed in a spaced relationship around the blade (14). Nozzles (20) extend through the enclosure (16) and direct a flow of gas onto both sides of the blade (14). The gas may be heated or cooled prior to delivery to the nozzles (20). The gas jets impinge upon the blade (14) to treat it.

28 Claims, 8 Drawing Sheets

○ Cooling nozzle (gas temperature below heat treatment temp, gas could be ambient, sub-ambient or above ambient but below heat treat temp)

● Heating nozzle (gas temperature above heat target temperature).

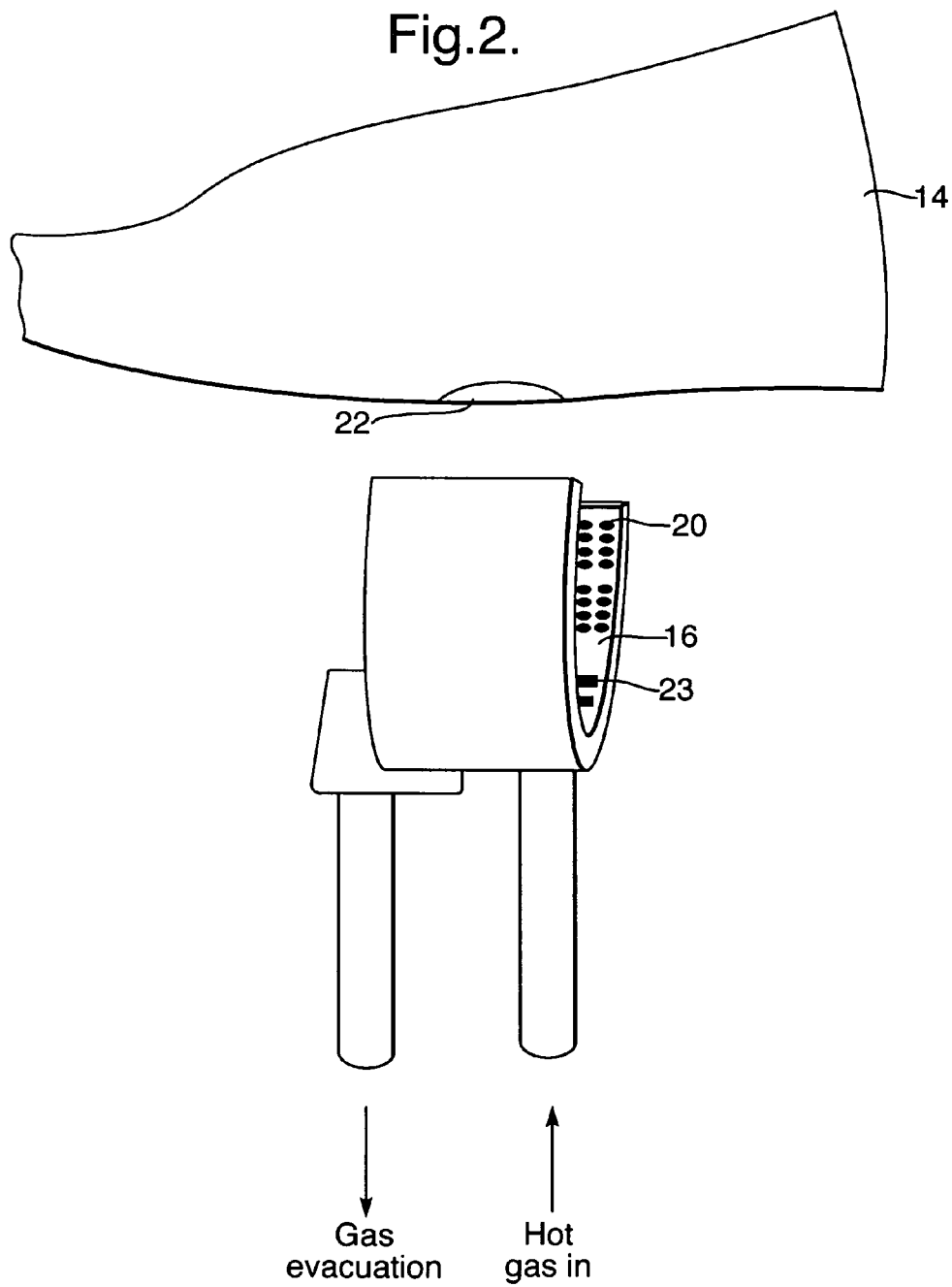

Hot gas ←          ← Cold gas

METHOD AND APPARATUS FOR THE TREATMENT OF A COMPONENT

FIELD OF THE INVENTION

The present invention relates to a method and apparatus for the treatment of a component. In particular it relates to a method and apparatus used in the treatment of at least a localised part of the component.

BACKGROUND OF THE INVENTION

Integrally bladed rotors, in which the blades and disc form one continuous piece of metal, are used in gas turbine engines. Integrally bladed rotors used in compression systems are typically manufactured from titanium. Parts of the integrally bladed rotor require heat treatment following welding or the deposition of material in the fabrication or repair process. Typically an integrally bladed rotor made from titanium will require a heat treatment of the order of 1-2 hours in a temperature range of 500-700 degrees Celsius.

Heat treatment of the whole integrally bladed rotor, particularly after a repair, is not always necessary and can result in problems such as the formation of alpha-case on the finished titanium component.

It is known to locally heat parts of an integrally bladed rotor using induction or radiant heaters. U.S. Pat. No. 6,787,720 B2 discloses a device, which comprises a jacket made from a high temperature cloth material. Heating elements are woven into the fabric of the jacket and are used to heat treat part of an aerofoil in an integrally bladed rotor.

For radiant heating to be effective in delivering heat to a small repaired volume the heating elements typically have to be above the target temperature. This has the disadvantage that there is a significant risk of overheating thinner sections of the aerofoil, such as the leading and trailing edges.

Brazing is a joining process whereby generally a non-ferrous filler metal and an alloy are heated to melting temperature and distributed between two or more close-fitting parts by capillary action. Localised heat treatment of brazing systems risk damaging the workpiece and require considerable skill and complex control systems. Laser brazing uses a high intensity heat source that requires rapid movement to avoid local heat rises and surface over temperature, which can cause corrosion and fatigue. Brazing using an oxy-acetylene torch is diffuse heating, but the torch is oxidising and inappropriate for reactive materials and the gaussian-type heat spread complicates control of the gas temperature.

Components are often thermally cycled to test for thermal-mechanical fatigue, or observe crack growth. Samples are heated by furnaces or induction coils and subsequently removed to undergo cooling by air jets, fans, water or nitrogen. As the component must be removed from the furnace during each cycle, the cycle time is relatively poor and it is also difficult to regulate the temperature of the sample, especially where complex component geometries are employed. Heat also flows through the gripping arrangement. Induction heat treatment is highly sensitive to minor positional variations and geometric features such as notches or grooves, where the induction heater can fail to heat the internal faces of the notch, which can lead to a significant temperature gradient in the groove. Where the component can be heated through induction the induced magnetic fields can cause problems with instrumentation.

There can also be difficulties observing test results as oxidation of the test piece at high temperatures can obscure the sample and the formed coating can influence test results. Maintaining an inert shield for current heating methods is impractical.

SUMMARY OF THE INVENTION

The present invention seeks to provide a method and apparatus for the treatment of at least part of a component, which overcomes the aforementioned problems.

According to one aspect of the present invention apparatus for the localised treatment of at least part of a component comprises an enclosure adapted to fit in a spaced relationship around part of the article to be treated, the enclosure having a plurality of nozzles therein through which in operation a flow of inert gas passes, the nozzles direct the inert gas onto the part of the component to be treated.

The nozzles may be arranged in rows and the inert gas passing through one row of nozzles may be at a different temperature to the gas passing through an adjacent row of nozzles. In this way the temperature across the component can be controlled more accurately.

The inert gas may be heated or cooled. The means for heating the inert gas prior to delivery to the nozzles may be included in the enclosure. The means for heating the inert gas may be a plasma arc heater, a ceramic heating plate or an electrical heating element.

The pressure drop through the nozzles may be of the order of 2:1 so that the gas is delivered at a high velocity. A high velocity flow of gas is required so that the gas can penetrate the insulating boundary layer and heat exchange with the component.

In the preferred embodiment of the present invention the inert gas is extracted from the enclosure.

In one embodiment of the present invention a seal is provided around the enclosure to seal the enclosure to the component. The seal may comprise a skirt of flexible material and could be porous. The gas is extracted from the sealed enclosure through slots in the enclosure. The slots may be located between the nozzles and the gas is sucked through the slots. The slots may be connected to a chamber maintained at a lower pressure than the pressure at which the gas is delivered through the nozzles.

In operation the enclosure may be oscillated to prevent the stagnation of the gas flow beneath the nozzles.

At certain locations insulation may be provided between the enclosure and the component. The insulation is provided adjacent to thin regions of the component to prevent overheating in these regions. The insulation used may be a ceramic cloth or a ceramic felt/wool.

In accordance with a second aspect of the present invention a method of locally treating at least a part of a component comprises the steps of placing an enclosure in spaced relationship around the part of the component to be treated, passing an inert gas through the enclosure and directing the gas at the component, the gas impinging on the part of the component to be treated.

The gas may be heated or cooled before passing it through the enclosure.

Preferably the gas is heated and is directed at the component through nozzles mounted in the enclosure. The nozzles may be arranged in rows and the gas is heated to different temperatures for the different rows of nozzles.

The method may include the additional step of extracting the gas from the enclosure. Extraction may be through slots in the enclosure.

Preferably the enclosure is sealed to the part of the component to be treated.

BRIEF DESCRIPTION OF THE DRAWINGS

The present invention will now be described with reference to the accompanying figures in which;

FIG. 2 is a perspective view of part of a heating device approaching a blade from the rotor of FIG. 1.

DETAILED DESCRIPTION OF THE INVENTION

Figure 1:
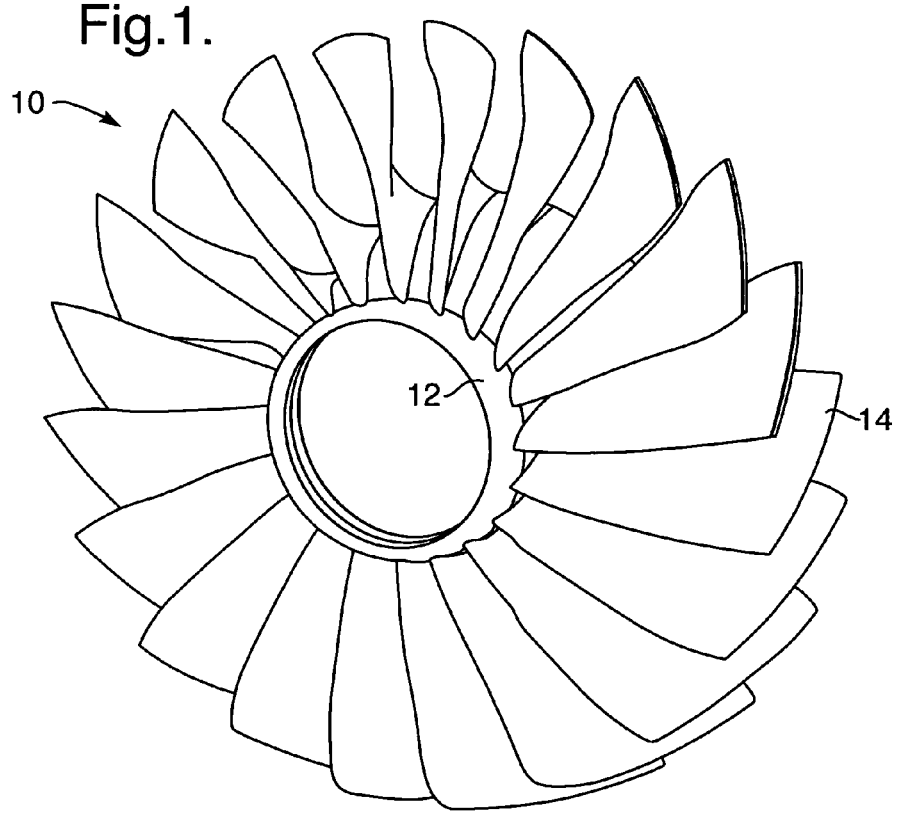
FIG. 1 is a schematic of an integrally bladed rotor for use in a gas turbine engine.

Referring to FIG. 1 an integrally bladed rotor 10 comprises a disc 12 to which individual blades 14 are attached. The rotor 10 is made from titanium and individual blades 14 are attached to the outer surface of the disc 12 by linear friction welding. In the fabrication process the blades 14 are oscillated relative to the disc 12, which is held stationary. The oscillating blades 14 are brought into contact with the disc 12 whilst a force is applied. The force applied is sufficient to melt the material at the interface and weld the blades 14 to the periphery of the disc 12.

If during operation of the engine a blade 14 in the rotor 10 is damaged the damaged portion has to be removed and replaced by either welding on a replacement part or depositing new material. Once completed the repaired area of the blade 14 must be heat treated to remove any residual stress introduced during the welding or deposition repair process.

Figure 3:
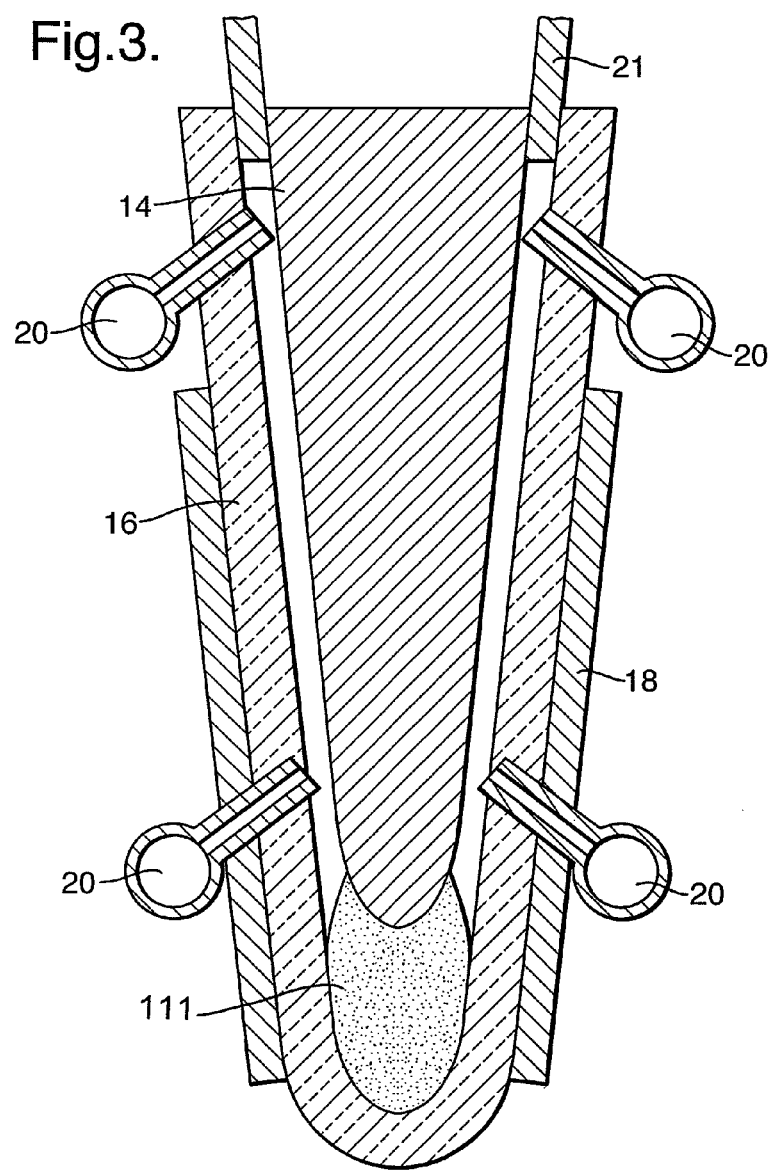
FIG. 3 shows part of an aerofoil encapsulated in a heating device in accordance with the present invention.

In FIG. 2 the blade, with the repaired portion 22 is inserted into the enclosure 16. As shown in FIG. 3, the enclosure 16 extends around the repaired area of the blade 14. The enclosure 16 is made from either a ceramic or steel, preferably the steel is coated with a thermal barrier coating.

A series of nozzles 20 extend through the enclosure 16 and through a thermal insulator 18 provided on the outer surface of the enclosure 16. A flow of an inert gas, such as argon, passes through nozzles 20 and is directed so that it impinges upon both sides of the repaired blade 14. The argon gas is heated to a temperature sufficient to heat treat the enclosed area of the blade 14. For titanium blades 14 the repaired area is heat treated for a period of one to two hours at a temperature in the range of 500-700 degrees Celsius.

Figure 4:
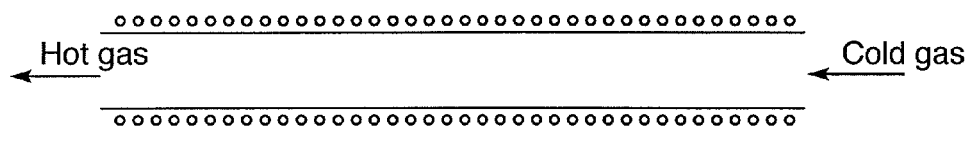
FIG. 4 is a schematic of a heater for the gas.

In the preferred embodiment of the present invention argon is heated by a heat exchanger based on electrical resistance heaters, plates, wires or other surfaces. It will however be appreciated that other means of heating may be used depending on the type of gas to be heated and the specific application. For example plasma arc heaters, ceramic plate heaters, electrical heating elements or catalyst heaters could heat the gas. The preferred heater is depicted in FIG. 4 and consists of two coaxial ceramic tubes with a supported 3 kW nickel based electrical heating element wrapped around the central ceramic tube. Preferably the element is helically wrapped, but it may also be lobed or have concentric spiral windings. The cold gas enters one end of the central core and exits from the opposite end. The heater can produce a hot gas flowrate in excess of 100 litres per minute. The gas exiting the heater passes through a ceramic tube and the temperature exiting the heater is monitored.

Figure 5:
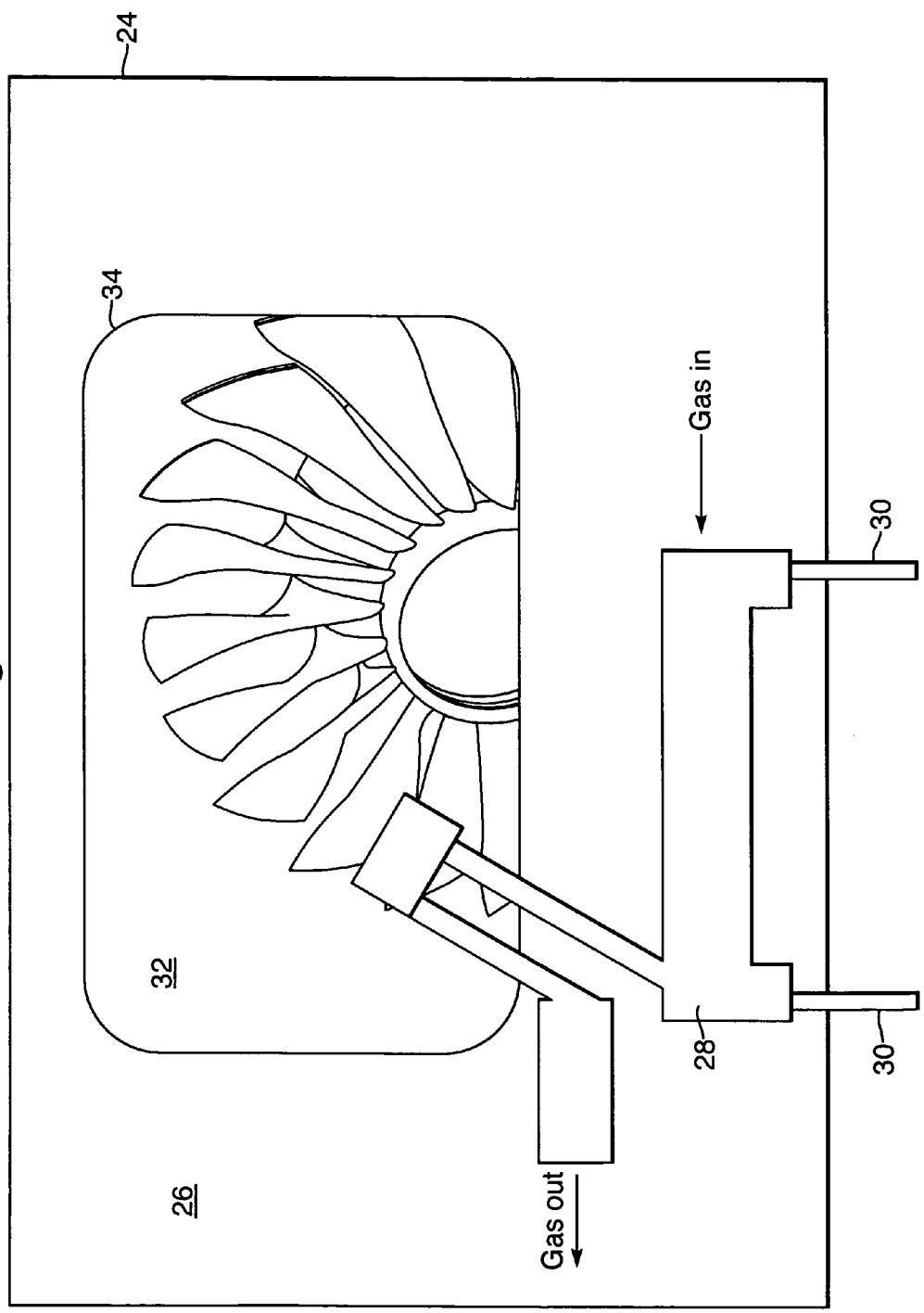
FIG. 5 shows a system in accordance with the present invention.

As shown in FIG. 5, the argon is heated within an enclosure 24. The pressure within the chamber is of the order of two atmospheres and the argon is heated to a temperature of between 500-700° C. Power is supplied to the heater 28 and the fan via power connections 30 that extend through the wall 24 of the outer argon chamber 26. When the argon reaches the required temperature of between 500-700° C. it is directed by the nozzles 20 onto the surface of the blade 14 via the enclosure 16.

In some embodiments, particularly where it is difficult to get the enclosure to seal against the component undergoing heat treatment, for example where the component has an intricate curved geometry or large thermal expansion, it is necessary to place the component within an inner chamber isolated from the outer chamber 26 by a bag-type wall 34. The wall 34 can insulate the inner chamber 32 from the outer chamber 26 allowing a disparate temperature between the two. Control of the Argon purity may also be effected.

A higher heat transfer coefficient is achieved between the gas and the blade 14 if the gas is delivered at a high velocity. A supersonic flow is preferable, but not required for the gas to penetrate the insulating boundary layer and heat exchange with the metal surface of the blade 14. Supersonic flow is preferred where there is a larger standoff between the component and the nozzle as directionality is improved with less flare of the gas stream. To achieve a supersonic flow a pressure drop of the order of 2:1 through the nozzles is adequate. The chamber delivers the argon at a flow rate of 100 litre/min for a nozzle diameter of 2 mm.

Figure 6:
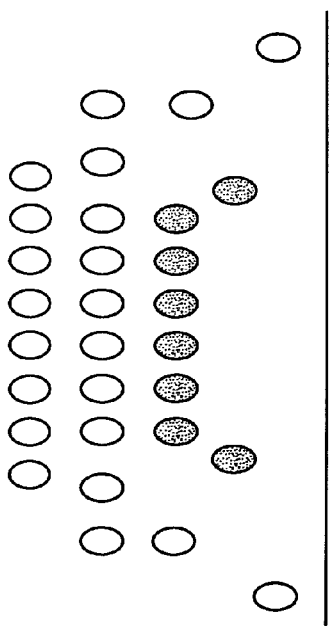
FIG. 6 shows an array of nozzles suitable for heat-treating the leading edge of a blade shown in FIG. 1.

The nozzles 20 around the leading edge of the blade 14 are arranged in rows as shown in FIG. 6, or other pattern. The argon supplied to the first row of nozzles 20 is heated to a temperature above that required for the heat treatment process. The argon gas supplied to the adjacent rows of nozzles 20 is cooler. The cooler gas controls heat transfer from the region to be heat treated to the adjacent regions of the blade 14.

The gas is extracted to reduce the heat transferred to other areas of the blade 14 which do not require heat treatment. In the embodiment of the present invention shown in FIG. 2 the gas is expelled at the edges of the enclosure 16.

However in a further embodiment of the present invention the enclosure 16 is sealed around the repaired area of the blade 14 and a gas extraction system removes the argon.

A flexible sealing skirt 21, as shown in FIG. 3, is provided around the periphery of the enclosure 16 adjacent to the blade 14. The sealing skirt between the enclosure 16 and the blade 14 must be flexible enough to accommodate undulations in the surface of the blade 14 whilst stiff enough to seal with the blade. Materials such as Isofrax™, Dalfratex™ and stainless steel are examples of materials that are suitable for the manufacture of the skirt. Alternatively an inflatable seal could be used as described in the applicant's co-pending patent application GB0402951.8.

The gas is extracted from the sealed enclosure through a fan-assisted exhaust. The gas in the enclosure 16 is sucked through a series of slots 23, as shown in FIG. 2, located between the nozzles 20 into the tube. When the gas is extracted it creates a low pressure within the enclosure 16. The pressure difference between the inside and outside of the enclosure 16 holds the sealing skirt in contact with the blade 14. The gas that has been exhausted is taken to a reservoir (not shown) where it is cooled further. The exhausted gas may also be passed through a gas scrubber to repurify it from the ingress of air or moisture.

Depending upon the application it is possible that hot spots could develop directly beneath the nozzles 20 where the gas flow stagnates. These hot spots can be reduced or eliminated by oscillating the enclosure 16.

To minimise the heating of thinner areas such as the leading edge, insulation 111 is inserted between the enclosure 16 and the leading edge of the blade 14. The insulation is a ceramic cloth or ceramic felt/wool, which diffuses the gas flow. The insulation 111 creates a low velocity region to prevent overheating the thinner leading edge of the blade 14.

Whilst the present invention has been described with reference to the heat treatment of a repaired blade it will be appreciated that it is equally applicable to the localised heat treatment of parts of other components. The number of nozzles used and their positions will depend upon the particular application and the heat treatment required.

Apparatus in accordance with the present invention can also be used to deliver an inert gas, such as argon, at ambient or lower temperatures. This would be useful to cool material deposited during the repair process. This offers the benefit that the apparatus can be used in multiple process operations. For example the apparatus would be used in a first instance to cool the material deposited in the repair process and then subsequently for heat treating by impinging jets of hot gas onto the repaired area of the blade 14.

Figure 7:
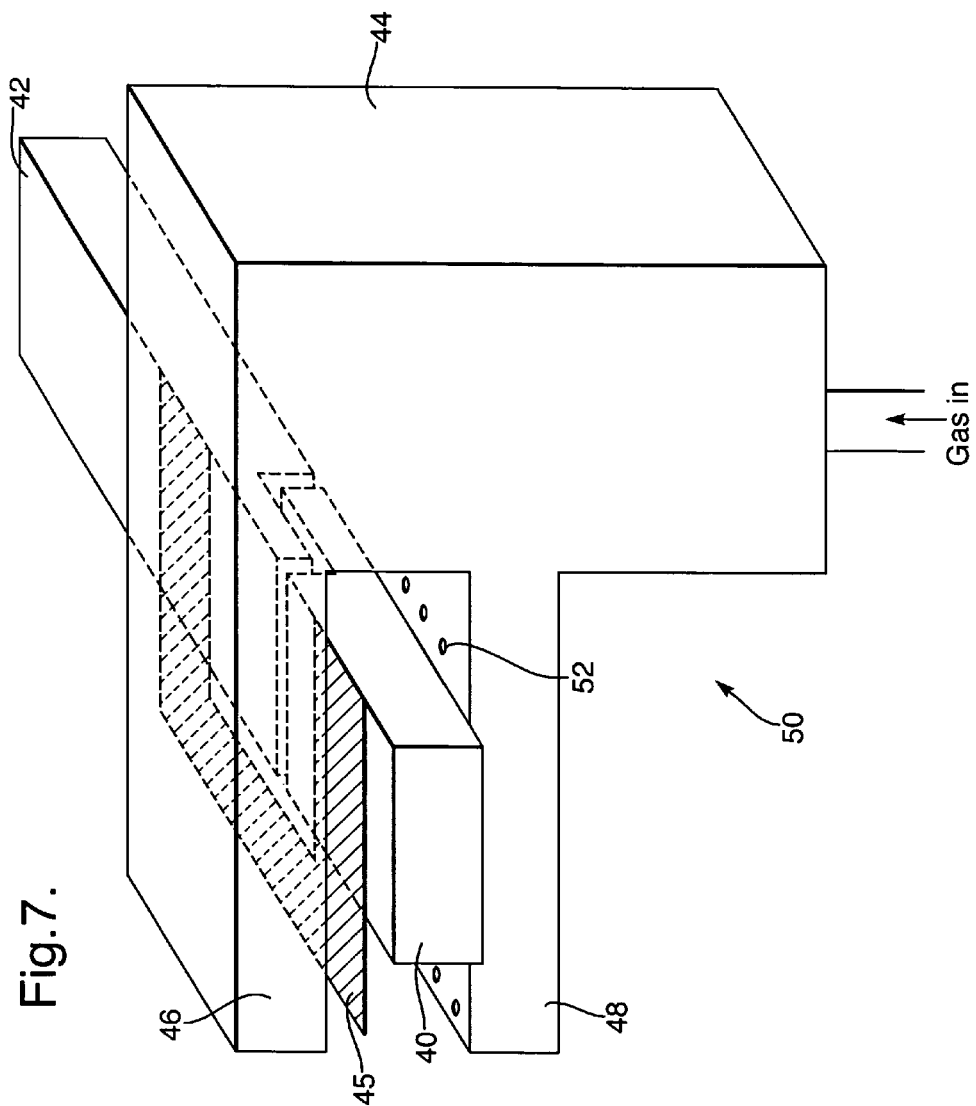
FIG. 7 depicts a joining tool in accordance with the present invention.

In a further embodiment, in accordance with the present invention, it is possible to braze or solder two components. A device suitable for brazing 75 micron gap lap joint between stainless steel sheets 40, 42 having thickness of 1.2 mm is disclosed in FIG. 7. The device is portable brazing gun 50 with a power and gas umbilical from a power source (not shown) and a heat source (not shown). The gun has a first arm 46 and a second arm 48 that extend around the joint. The arms are connected to a handle 44 that is insulated to protect the handler or the handling system, where the gun is connected to a robotic system, from radiant and convective heat. A regular array of nozzles 52 in the first and second arms allow the heated gas to be supplied locally to the joint area from a distance of around 3 mm from the surface. Each nozzle has a 1 mm diameter and is spaced 2 mm from an adjacent nozzle.

The heated gas flow is a reducing mixture of Argon with about 5% Hydrogen, though it will be appreciated that some other non-oxidising gas, or mixture of gasses may be used.

The nozzle structure and arrangement is such that an even lamellar flow over the surface is created with sufficient velocity to eliminate boundary layers. The nozzle has an axis that is perpendicular to the surface.

A braze material consisting of 50% Silver, 15.5% Copper, 15.5% Zinc, 16% Cadmium and 3% Nickel is supplied to the join area with the composition of the heated gas flow being such that the wetting angle of the braze is also optimised.

The braze material is added either as a foil sheet between the components or as a paste or foil to one or both of the external edges of the gap between the components.

A ceramic blanket 45 is laid over the component to protect those areas which do not require heating. The ceramic blanket therefore has a cut out portion that allows the gas to impinge directly onto the component.

Figure 8:
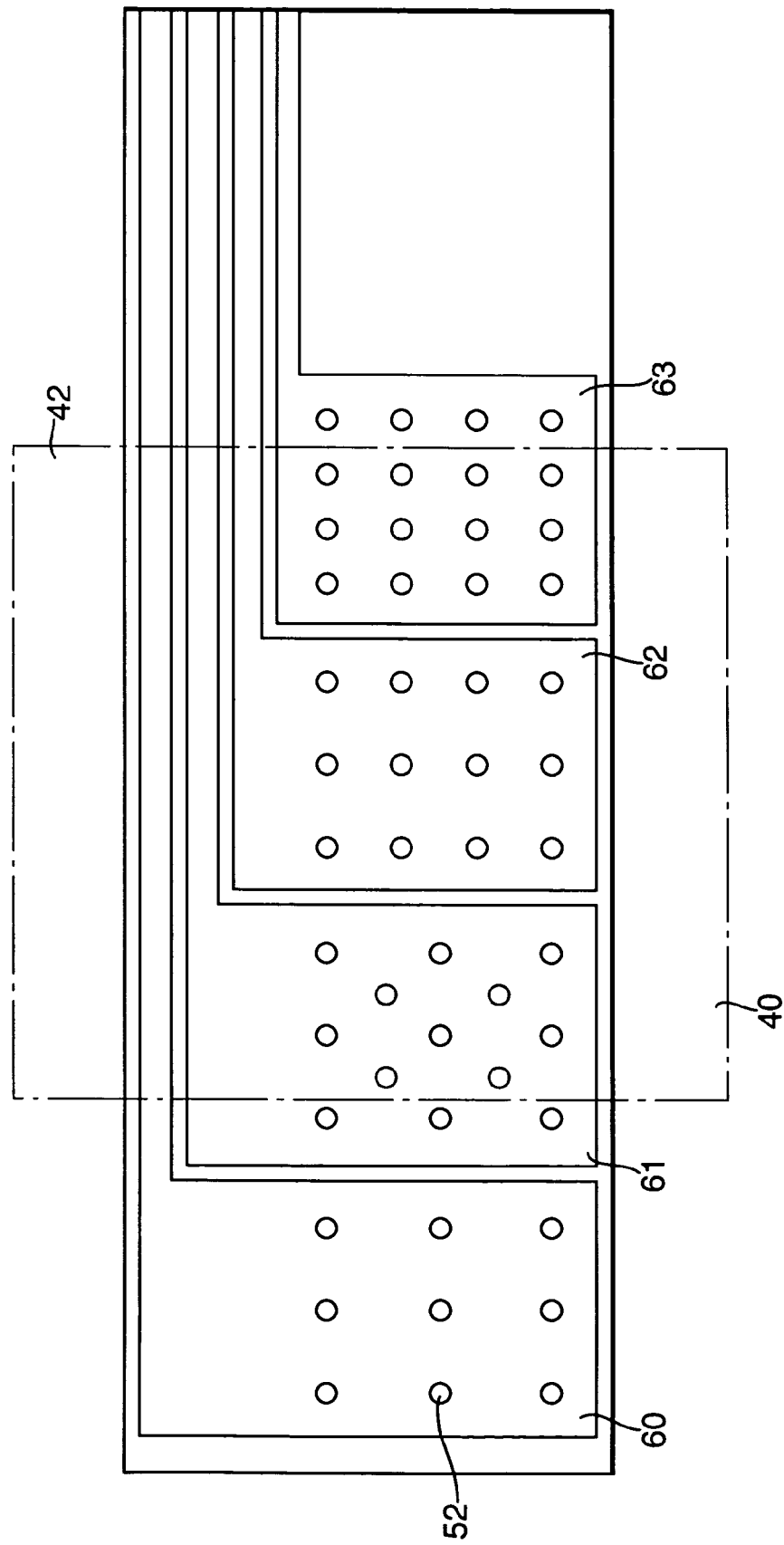
FIG. 8 depicts a cross section through am arm of the joining tool of FIG. 7.

FIG. 8 is a cross-section through the first arm 46. The arm has a four manifolds 60-63 each of which is supplied with gas at a selected temperature. The temperature, and composition of the gas, the nozzle position and size of nozzle 52 within each manifold is beneficially selected to optimise the braze process.

In this embodiment the temperature of the gas in manifold 60 is significantly lower that the temperature in the other three manifolds 61, 62, 63. The lower temperature allows a thermal camera (not shown) to be placed in a line of sight position to monitor the brazing operation.

The gas heater consists of two coaxial ceramic tubes with a 3 kW nickel based electrical heating element wrapped, in a helical arrangement, around the central ceramic tube. The cold gas enters one end of the central core and exits from the opposite end. Typically, to braze an area of approximately 60 mm by 70 mm a flowrate of 100 litres per minute of gas is required.

The gas exiting the heater passes through a ceramic filter and the temperature exiting the heater is monitored. The gas is heated to within a few degrees of the melting temperature of the braze alloy. By setting the maximum operating temperature of the gas externally, the system is inherently safe with respect to over temperature, which may damage the joint.

Figure 9:
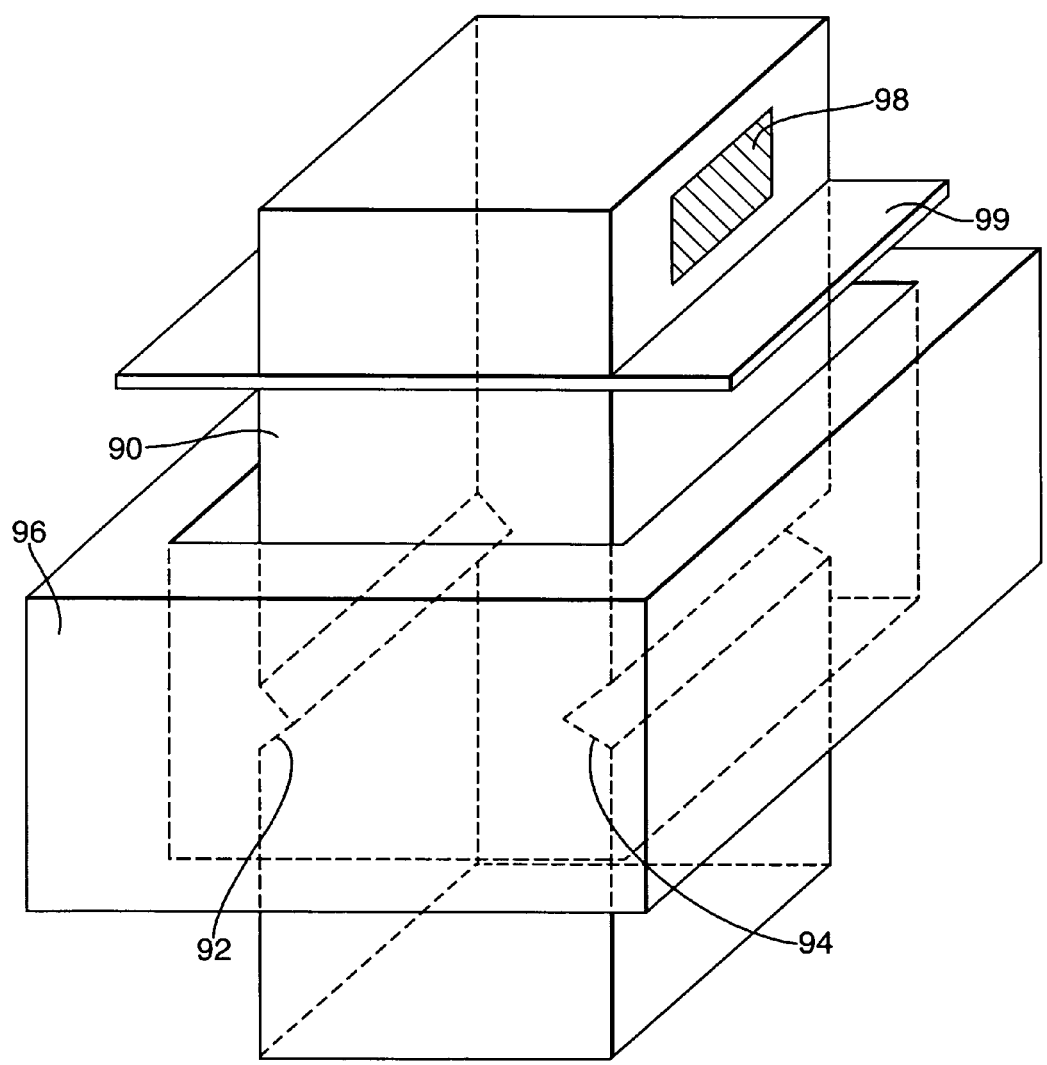
FIG. 9 depicts a thermal cycling tool in accordance with the present invention.

An embodiment of the apparatus may also be used in thermo-mechanical fatigue testing as will be described with respect to FIG. 9. A rectangular test piece 90 has "V" notches 92, 94 on opposing sides between which a crack is induced to propagate by thermal cycling.

A heating device 96 is placed around the test piece and hot gas is directed at the side faces to uniformly heat the test piece through impingement heating. An axial temperature gradient of no more than 10° C. can be maintained by a feedback control system. The temperature of the test piece is monitored by a thermocouple, or an optical pyrometer directed at a region on the sample that is coated in a constant emissivity paint.

Beneficially, the system heating system has a low thermal inertia, which enables a rapid heating. Hot gas is supplied to the housing from the heater described with reference to FIG. 4. A switch may be used to supply colder gas, which bypasses the heater, to the housing and allow relatively cooler air to be supplied to the housing with or without the heated gas. Beneficially, this allows the housing to be quickly purged of hot gas, where the flow of gas is stopped, which enables rapid cooling of the test piece. By allowing the colder gas to be supplied alongside the hot gas it is possible to accurately and quickly control the temperature of the gas in the housing. It will be appreciated that a separate hot gas inlet and cold gas inlet may be provided for each face to be heated and cooled, which allows different temperatures to be applied to each face without requiring a number of separate heaters as the selected temperature can be achieved through dilution with the colder gas.

Figure 10:
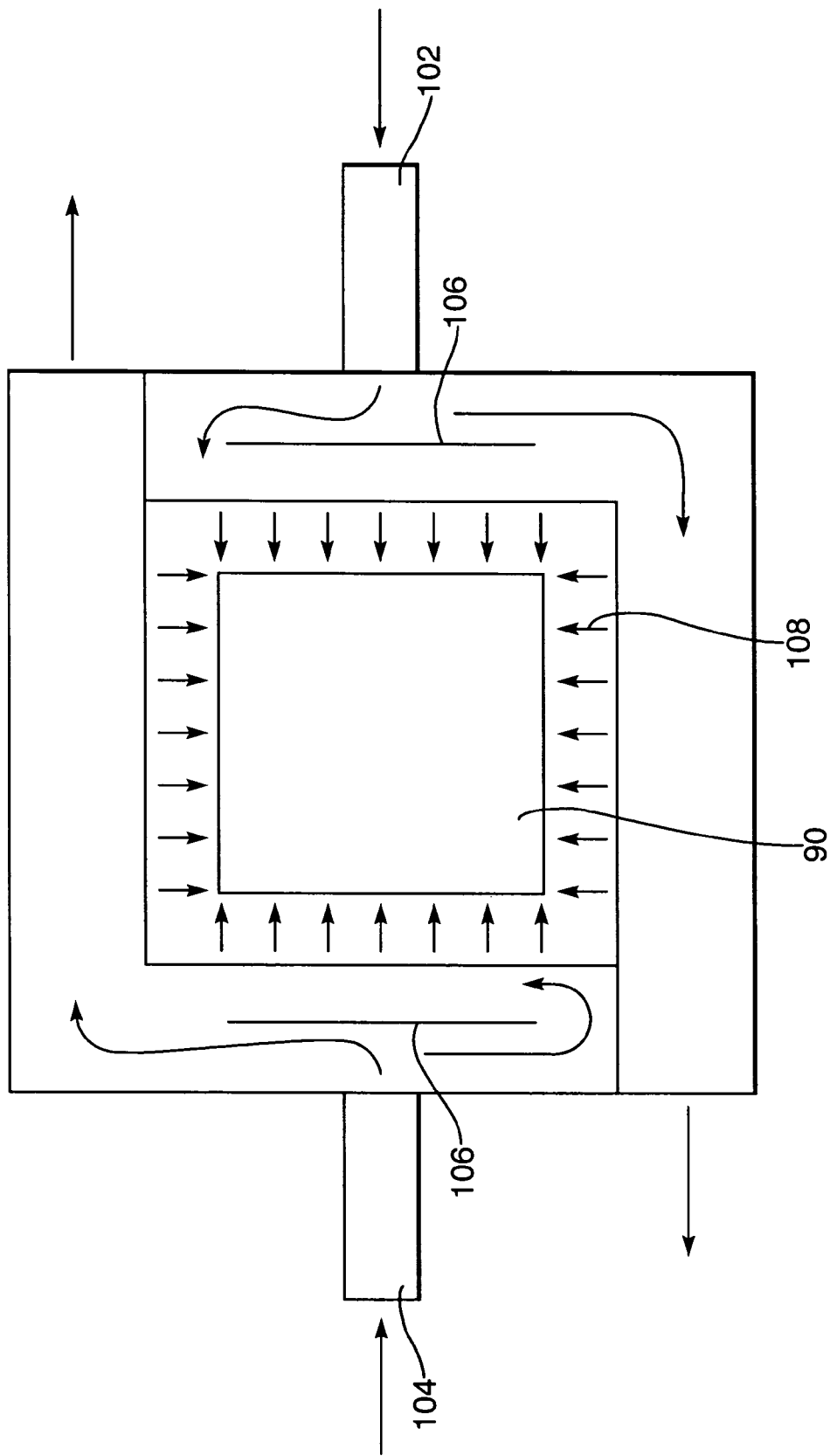
FIG. 10 is a cross section through the thermal cycling tool of FIG. 9.

As shown in FIG. 10, the heater can be provided with a first and second inlet 102, 104 that directs gas against a baffle 106 to diffuse the flow and ensure that a relatively constant velocity of gas 108 is directed against each side of the test piece 90.

Since the test piece extends above and below the heater it is possible to grip the piece in a relatively cold position 98. The grippers can be further isolated from hot gas expelled from the heater by placing a shield 99 in front of the grippers.

We claim:

1. An apparatus for the localised treatment of at least part of a gas turbine component with an inert gas, the apparatus comprising:
    an enclosure adapted to fit in a spaced relationship around the part of the gas turbine component to be treated, the enclosure having a plurality of nozzles therein through which in operation a flow of inert gas passes, the nozzles directing the inert gas onto the part of the component to be treated and characterised in that heating means are provided to heat the inert gas prior to delivery to the nozzles; and
    a seal being provided around the enclosure to seal the enclosure to the component.

2. An apparatus as claimed in claim 1 in which the nozzles are arranged in rows.

3. An apparatus as claimed in claim 2 in which the inert gas passing through one row of nozzles is at a different temperature to the gas passing through an adjacent row of nozzles.

4. An apparatus as claimed in claim 1 in which the means for heating the inert gas is a plasma arc heater or a ceramic heating plate or an electrical heating element.

5. An apparatus as claimed in claim 1 in which the pressure drop through the nozzles is of the order of 2:1.

6. An apparatus as claimed in claim 1 in which the seal is a skirt of flexible material around the enclosure.

7. An apparatus as claimed in claim 1 in which the inert gas is extracted from the enclosure by extraction means comprises comprising slots in the enclosure connected to a chamber maintained at a lower pressure than the gas delivery pressure.

8. An apparatus as claimed in claim 1 in which means are provided to oscillate the enclosure.

9. An apparatus as claimed in claim 1 in which the enclosure is insulated.

10. An apparatus for the localised treatment of at least part of a component comprising an enclosure adapted to fit in a spaced relationship around the part of the article to be treated, the enclosure having a plurality of nozzles therein through which in operation a flow of inert gas passes, the nozzles directing the inert gas onto the part of the component to be treated, and heating or cooling means provided to heat or cool the inert gas prior to delivery to the nozzles, wherein the component having a thicker section and a thinner section, and the nozzles are constructed such that during operation a velocity of the gas flow is reduced adjacent the thinner section of the component by insulation inserted between the enclosure and the thinner section of the component.

11. An apparatus as claimed in claim 10 in which the insulation is a ceramic cloth.

12. A method of locally treating at least a part of a gas turbine component with an inert gas, the method comprising the steps of:
    placing an enclosure in spaced relationship around part of the gas turbine component to be treated, the enclosure having a plurality of nozzles therein through which in operation a flow of inert gas passes;
    heating an inert gas to a temperature sufficient to treat the part of the gas turbine component enclosed by the enclosure;
    passing the heated gas through the enclosure and directing the gas at the component from the nozzles, the gas impinging on the part of the component to be treated.

13. A method as claimed in claim 12 in which the nozzles are arranged in rows.

14. A method as claimed in claim 13 in which the gas is heated to different temperatures for different nozzle rows.

15. A method as claimed in claim 12 including the step of extracting the gas after impingement on the part of the gas turbine component.

16. A method as claimed in claim 12 in which the enclosure is sealed in a spaced relationship around the part of the gas turbine component to be treated.

17. A method as claimed in claim 15 in which the gas is extracted by suction through slots provided in the enclosure.

18. A method as claimed in claim 12, wherein the part of the gas turbine component to be treated is a titanium blade in which the enclosure is held in spaced arrangement around the part of the titanium blade to be treated for a period of one to two hours at a temperature in the range of 500 to 700° C.

19. A method as claimed in claim 12, wherein the inert gas is directed at the part of the gas turbine component in a supersonic flow.

20. A method according to claim 12, in which the enclosure is oscillated for reducing or eliminating hot spots on the part of the gas turbine component.

21. A method according to claim 12, wherein the gas turbine component is a blade.

22. A method of thermally cycling a component comprising the steps of:
    placing an enclosure in spaced relationship around at least a first part of the component to be thermally cycled, wherein at least a second part of the component is not enclosed by the enclosure;
    repeating the steps of passing a relatively hot gas through the enclosure, directing the gas at the first part of component and subsequently cooling the first part of the component thereby inducing repeated relative thermal expansion and contraction of the first part of the component.

23. A method according to claim 22, wherein the step of cooling the component comprises the method of passing a relatively cooler gas through the enclosure and directing the gas at the first part of the component.

24. A method as claimed in claim 22 in which the gas is directed at the first part of the component by a plurality of nozzles in the enclosure.

25. A method as claimed in claim 24 in which the nozzles are arranged in rows.

26. A method as claimed in claim 25 in which the gas is heated to different temperatures for different nozzle rows.

27. A method as claimed in claim 22 including the step of extracting the gas after impingement on the first part of the component.

28. A method as claimed in claim 22 in which the enclosure is sealed in a spaced relationship around the first part of the component to be treated to seal the enclosure to the first part of the component.

* * * * *